No. 833,535. PATENTED OCT. 16, 1906.
F. LUTHER.
TAPER GAGE.
APPLICATION FILED APR. 28, 1906.
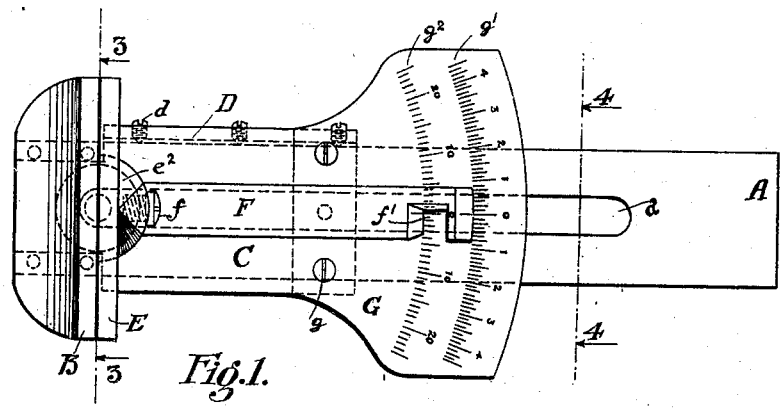
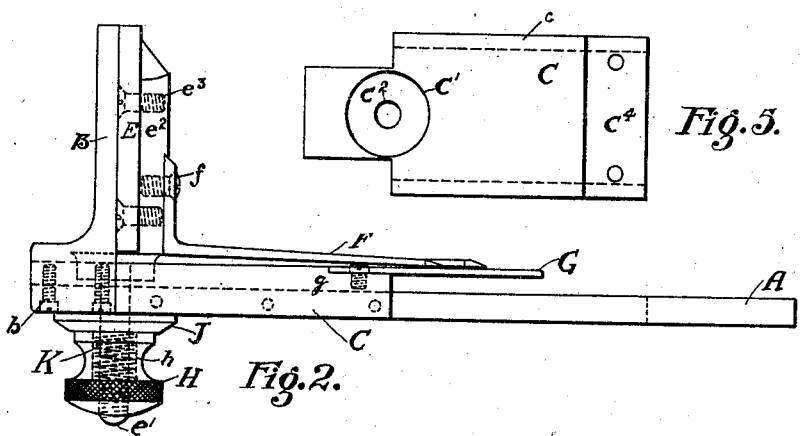
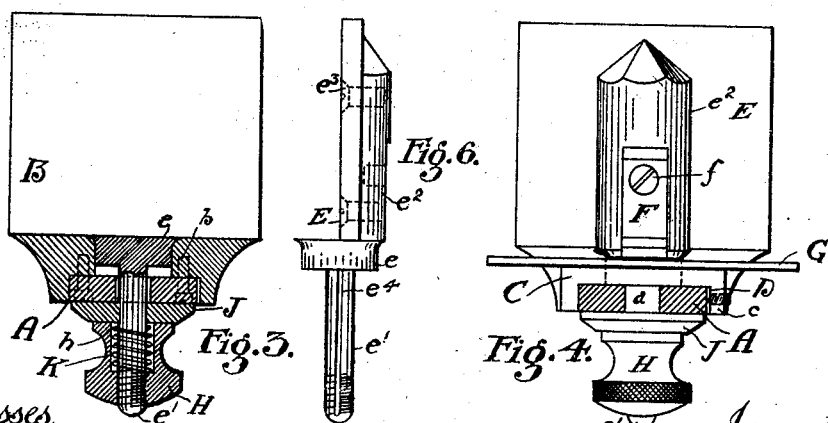
Witnesses.
J. A. Martinsoole.
L. H. Keller.
Inventor
Frank Luther,
by Bates, Fouts & Hull
Attorneys.

UNITED STATES PATENT OFFICE.

FRANK LUTHER, OF ELYRIA, OHIO.

TAPER-GAGE.

No. 833,535. Specification of Letters Patent. Patented Oct. 16, 1906.

Application filed April 28, 1906. Serial No. 314,257.

*To all whom it may concern:*

Be it known that I, FRANK LUTHER, residing at Elyria, in the county of Lorain and State of Ohio, have invented a certain new and useful Improvement in Taper-Gages, of which the following is a full, clear, and exact description, reference being had to the accompanying drawings.

The object of this invention is to provide a simple and accurate gage for measuring the taper of various articles—for example, parts of machines, as spindles, wedges, pins, &c. My gage shows the taper both in degrees and in fractions of an inch to the foot. It will be easily seen that the value of such a gage is dependent upon its accuracy, while it is desirable that the gage may be easily and quickly set for the piece being gaged.

The characteristics of the invention by which I attain the desired results of ease of operation and accuracy of indication are hereinafter more fully explained, and definitely summarized in the claims.

The drawings clearly illustrate my invention.

Figure 1 is a plan of the gage. Fig. 2 is a side elevation thereof. Fig. 3 is a cross-section on the line 3 3 of Fig. 1. Fig. 4 is a cross-section on the line 4 4 of Fig. 1. Fig. 5 is a plan of the sliding block which carries the indicator. Fig. 6 is an edge view of the movable gage-plate and its pivot.

Referring to the parts by letters, A represents a bar having rigidly secured to its end a stationary abutment-plate B. As shown in the drawings, the bar A seats in a recess in the base of the plate B, being secured therein by screws $b$. Resting on the bar A is the block C, which has on its under side a groove to receive the bar A, the block thus having walls extending down onto the opposite edges of the bar A. In order to have this block fit the bar with the desired snugness and at the same time allow it to slide thereon, I make the groove referred to somewhat wider than the bar and fill the space by a liner D on one side of the bar, this liner being held in place by pointed set-screws $d$, screwing through the wall $c$ of the block C against the liner. These set-screws provide for adjustment of the liner, as desired. The sliding block C has in it a circular recess $c'$, in which seats a circular head $e$, provided on its under side with an axial pin $e'$, which occupies a hole $c^2$ in the base of the recess and occupies also a slot $a$ in the bar A. Extending upward from the head $e$ is a post $e^2$, to the rear face of which is rigidly secured a plate E by screws $e^3$. The rear face of this plate is in alinement with the axis of the pin $e'$. Mounted on the forward side of the post $e^2$ is a pointer F, shown as held in place by a screw $f$. This pointer extends over the face of a graduated plate G, which is secured to the forward end of the block C. As shown, this plate G seats in a recess $c^4$ in the block and is held by screws $g$.

When the plate E is parallel with the guide-plate B, the pointer F is opposite the zero-mark of the graduations on the plate G, these graduations reading in each direction from such central zero-mark. It thus results that if a tapered article be placed between the plates B and E the angular position of the plate E will cause the pointer to occupy a position at one side or the other of the center of the graduated plate, and if the graduations are properly made the taper of the article may thus be indicated. As shown in the drawings, a double indication is provided by means of two scales, one, as $g'$, being for inches per foot and the other, $g^2$, being in degrees. The pointer is provided with a notch $f'$, which gives it two edges coöperating with the respective scales, suitable indicating-marks being provided on these edges.

It is to be understood that in measuring the articles the block C, together with the plate E and pointer mounted thereon, is shoved along the bar A to allow the insertion of the article between the plates B and E. When these plates are brought snugly against the article, the sliding member may be clamped in place by the nut H, which screws onto the pin $e'$ and bears against the under side of the bar A. This nut H is preferably knurled, as shown, to allow it to be conveniently turned, and its inner end rests directly on a washer J, which rests against the bar A. This washer preferably has a tongue extending into a groove $e^4$ in the pin $e'$, so that the washer cannot be turned. The nut H is provided with a recess $h$ about the pin, and in this recess is a helical spring K, adapted to bear against the washer. This spring serves to keep the block C firmly on the bar A and the plate E and its attached parts in position on this block when the nut H is loosened to shift the block. This screw serves at once as the means for clamping the block in position and as a handle by which it may be shifted.

It will be seen that with my gage there are no loose parts to render the indication inaccurate. The sliding block C is caused to fit the bar A snugly at all times, while the rotating member E and its attached parts are at all times properly held on the block. By reason of the head $e$ occupying the recess $c'$ on the block a firm bearing is made, preventing play between these parts.

Having thus described my invention, I claim—

1. In a taper-gage, the combination of a bar, an abutment carried thereby, a block slidable upon said bar, a member adapted to coöperate with said abutment and mounted on a pivot which is journaled in the block and extends through a slot in the bar, and a pointer and scale, one of which is carried with the block, and the other with the pivoted plate.

2. The combination of a slotted bar, an abutment mounted thereon, a block slidable upon said bar, a pin rotatably mounted on said block and passing through said slot, a plate and pointer carried by said pin, a coöperating scale carried by the block, and a clamping-nut screwing onto said pin.

3. In a taper-gage, the combination of a slotted bar, a block slidable thereon and extending onto the two sides of the bar, a head rotatably mounted on the upper side of said block, said head having a pin extending through the block and through said slot, a nut screwing onto said pin and bearing against the under side of the bar, an abutment carried by said bar, and a gage-plate carried by said head, and a pointer and scale carried one member by the head, and one member by the sliding block.

4. The combination of a slotted bar, a sliding block seated thereon, said block having a circular recess, a circular head occupying said recess, a pin extending from said head through the block and through the slot, a nut screwing onto the pin and adapted to bear against the bar, a post extending from said head, a plate secured to said post, and a coöperating abutment carried by the bar.

5. The combination of a bar, a block slidable thereon and grooved to receive said bar, an adjustable liner occupying the groove to fit snugly on the edge of the bar, a pair of abutment members, one of said members being carried by the block and one by the bar, one of said members being pivoted, and means for clamping said pivoted member.

6. In a taper-gage, the combination of two members, one slidable upon the other, a pin mounted on one member and extending through a slot in the other, a nut screwing onto said pin, said nut having a recess, a spring within said recess acting to hold two members snugly together, and means carried by said members and adapted to engage the article to be gaged.

7. In a taper-gage, the combination of two members, one slidable upon the other, a pin mounted on one member and extending through a slot in the other, a nut screwing onto said pin, said nut having a recess, a spring within said recess acting to hold two members snugly together, plates carried one by one member, and one by the other, and one of said plates being pivoted by being mounted on said pin, whereby said nut may clamp the two members in desired position, and at the same time clamp the rotatable plate in position on its member.

8. In a taper-gage, in combination, a slotted bar, a rigid head carried thereby at right angles thereto, a block slidable upon said bar and having a recess, a circular head seating in said recess and having a pin passing through said slot, a nut screwing onto said pin and bearing against the under side of said bar, a post extending from the upper side of said head, a plate secured to said post coöperating with the rigid head mentioned, a pointer secured to said post and a coöperating scale-plate secured to said block.

9. The combination of a bar, an abutment rigidly secured thereto at right angles to the bar, a block slidable upon the bar, a pivot-pin journaled in said block and passing through a longitudinal slot in said bar, a nut screwing onto said pin and bearing against the under side of said bar, a plate rigidly mounted on said pin above the block, a pointer rigid with said plate, and a coöperating scale rigid with said block.

In testimony whereof I hereunto affix my signature in the presence of two witnesses.

FRANK LUTHER.

Witnesses:
 GEO. P. GUTHRIE,
 C. M. THEOBALD.